United States Patent [19]
Berzins et al.

[11] Patent Number: 5,610,704
[45] Date of Patent: Mar. 11, 1997

[54] PROBE FOR MEASUREMENT OF VELOCITY AND DENSITY OF VAPOR IN VAPOR PLUME

[75] Inventors: Leon V. Berzins, Livermore; Bradford A. Bratton, Bethel Island; Paul W. Fuhrman, Livermore, all of Calif.

[73] Assignee: The United States of America as represented by the United States Department of Energy, Washington, D.C.

[21] Appl. No.: 345,683

[22] Filed: Nov. 21, 1994

[51] Int. Cl.$^6$ .............................. G01N 21/00; G01P 3/36
[52] U.S. Cl. ............................ 356/28.5; 356/437
[58] Field of Search .......................... 356/28, 28.5, 437

[56] References Cited

U.S. PATENT DOCUMENTS

| | | | |
|---|---|---|---|
| 2,878,388 | 3/1959 | Bergson | 250/373 |
| 3,861,809 | 1/1975 | Hall, Jr. | 356/418 |
| 4,640,621 | 2/1987 | Rose | 356/434 |
| 4,746,218 | 5/1988 | Lord, III | 356/437 |
| 4,756,622 | 7/1988 | Wong | 356/437 |
| 4,934,816 | 6/1990 | Silver et al. | 356/409 |
| 4,937,461 | 6/1990 | Traina | 250/575 |
| 5,252,828 | 10/1993 | Kert et al. | 250/339.13 |

*Primary Examiner*—Thomas H. Tarcza
*Assistant Examiner*—Pinchus M. Laufer
*Attorney, Agent, or Firm*—Townsend and Townsend and Crew LLP

[57] ABSTRACT

A probe which directs a light beam through a vapor plume in a first direction at a first angle ranging from greater than 0° to less than 90°, reflecting the light beam back through the vapor plume at a 90° angle, and then reflecting the light beam through the vapor plume a third time at a second angle equal to the first angle, using a series of mirrors to deflect the light beam while protecting the mirrors from the vapor plume with shields. The velocity, density, temperature and flow direction of the vapor plume may be determined by a comparison of the energy from a reference portion of the beam with the energy of the beam after it has passed through the vapor plume.

18 Claims, 5 Drawing Sheets

PROBE FOR MEASUREMENT OF VELOCITY AND DENSITY OF VAPOR IN VAPOR PLUME

STATEMENT OF GOVERNMENT INTEREST

The United States Government has rights in this invention pursuant to Contract No. W-7405-ENG-48 between the United States Department of Energy and the University of California for operation of Lawrence Livermore National Laboratory.

BACKGROUND OF THE INVENTION

This invention relates to a probe for the measurement of the vapor velocity, density, temperature, and flow direction of vapors, such as metal vapors, in a vapor plume from a vaporization source.

It is desirable to know the characteristics of the vapor in a vapor plume, including the density, velocity, temperature, and direction of flow of the vapor emanating from a vapor source so that use of the vapor source, for example, for coating of a substrate, may be optimized. By knowing the flux (density and velocity) of the vapor in the vapor plume, one may be able to determine, for example, how to move either the vapor source or the object to be coated, in a manner which will result in achieving a uniform coating on the object to be coated.

In the past, several different methods have been employed to obtain such information, with each method having significant drawbacks. These methods include multiple discrete shots through the total vapor plume and multiple discrete local measurements at various angles, as well as time averaged methods such as measuring the coating shadow past a hard edge after the run is over. In general, however, such methods are either significantly more complicated in both hardware and analysis or are less quantitative and incomplete as compared to a vapor probe.

SUMMARY OF THE INVENTION

The invention comprises a probe capable of measuring the velocity, density, temperature, and flow direction of vapor in a vapor plume which comprises a housing; a passageway within the housing for providing a flow of vapor through the probe along a straight flow channel therein; a light processing unit for providing a narrow spectral linewidth beam of collimated and polarized light in the probe; a beam splitter for splitting the beam of light into two beams, a reference beam and a main beam; a first detector for detecting the energy of the reference beam; a first reflective unit for diverting the main beam to cross the flow path of the vapor in the probe through the straight flow channel passageway therein at a first angle of from greater than 0 degrees to less than 90 degrees with respect to the main axis of the straight flow channel passageway; a second reflective unit for diverting the main beam path at an angle sufficient to cause the main beam path to recross the vapor flow in the flow channel in a perpendicular direction to the main axis of the straight flow channel passageway; a third reflective unit for causing the main beam path to cross the vapor flow in the flow channel for a third time at a second angle, with respect to the main axis of the straight flow channel passageway, with the second angle equal to the first angle; and a second detector for measuring the energy of the main beam after it has crossed the vapor flow in the straight flow channel passageway three times.

BRIEF DESCRIPTION OF THE DRAWINGS

FIG. 6A is a side elevation view showing the lateral adjustment of the probe of the invention along one axis and rotational adjustment of the probe in one dimension relative to the vapor source.

FIG. 6B is a side elevation view showing the lateral adjustment of the probe along a second axis and rotational adjustment of the probe in a second dimension relative to the vapor source.

FIG. 6C is a top view of one of the adjustable mounting brackets shown in

FIGS. 6A and 6B used to mount the probe to the vapor source.

DETAILED DESCRIPTION OF THE INVENTION

The probe of the invention permits measurement of the velocity, density, temperature, and flow direction of a vapor plume from a vapor source as it flows through a central passageway in the probe by providing a beam of collimated and polarized light which is reflected by optical mirrors to pass through the vapor plume three times: a first time at a first angle of from greater than 0 degrees to less than 90 degrees with respect to the main axis of the passageway and the vapor flowing therethrough, a second time at approximately a right angle to the passageway and the vapor flow, and a third time at an angle equal to the first angle. (The vapor probe is designed to measure the deviation of the alignment from the flow direction.) The energy in the beam of light is then detected and compared with the detected energy in a reference portion of the same beam which has not passed through the vapor plume. Comparison of the ratio of the respective detected energies, as the narrow linewidth beam is scanned in frequency, permits determination of the velocity and density of the vapor plume. The output of the signal and reference detectors are ratioed to minimize the effects of power fluctuations in the laser and sound noise sound external to the vapor plume (which is standard in absorption spectroscopy). The size, location, and width of the minima in the ratio permits determination of the velocity, density, temperature, and flow direction of the vapor plume.

Figure 1:
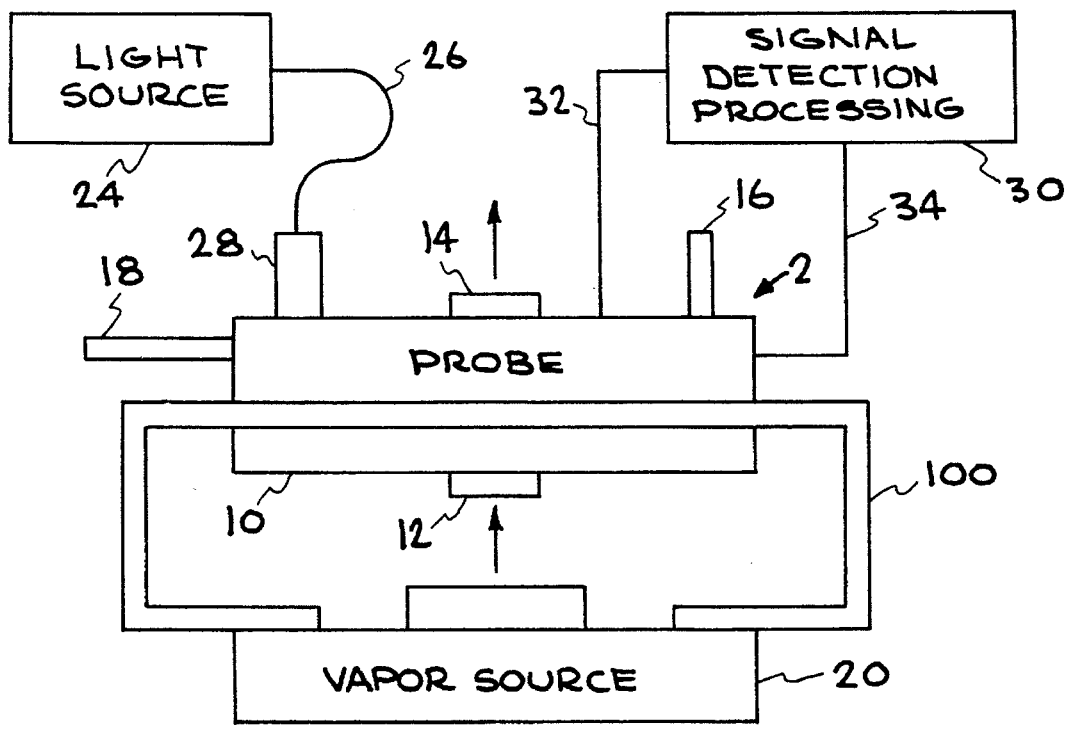
FIG. 1 is a side view showing the probe mounted to a vapor source and connected to a light source and a signal detection processing station.

Turning now to FIG. 1, the probe of the invention is generally indicated at 2 comprising a housing 10 tiltably mounted on a bracket 100 which, in turn, is slidably mounted above a vapor source 20, as will be described in more detail below. Probe housing 10 is provided with a vapor inlet port 12 and a vapor outlet port 14 through which the vapors to be analyzed pass from vapor source 20. Probe housing 10 is further provided with a coolant inlet port 16 and a coolant exit port 18 which permits the circulation of coolant through the probe to thereby maintain a predetermined temperature therein. The coolant flows through channels in the probe adjacent but separate and distinct from the vapor path in the probe. As will be described in more detail below with respect to the optical path shown in FIG. 2, light from a light source 24, such as a laser light source, is passed by a fiber optics cable 26 to fiber optics connector 28 mounted on housing 10 of probe 2. Light detectors within probe housing 10 respectively detect the light from a reference portion of the light beam from light source 24 and the light after it has passed through the vapor plume in the probe, as will also be explained below. The light detectors are respectively connected, via cables 32 and 34 to a signal detection processing station 30 wherein the detected signals from the light beam are processed and analyzed to determine the velocity, density, temperature, and flow direction of the vapor in the vapor plume flowing through probe 2.

Figure 2:
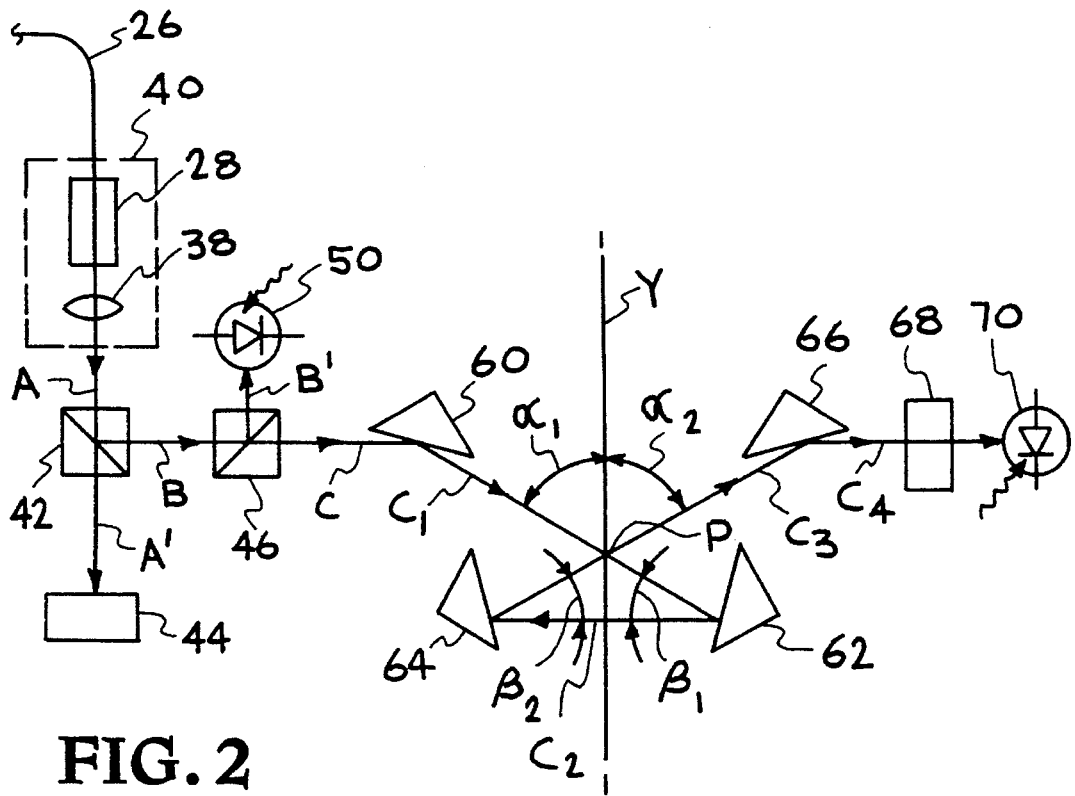
FIG. 2 is a schematic view of the optical beam path through the probe.

FIG. 2 shows the optical path A of the light beam from light source 24 as it travels through probe 2. Light from light source 24 travels via fiber optic cable 26 to fiber optics connector 28, which together with a lens 38 comprise a combined connector/collimator unit 40 mounted to wall 10 of probe 2. Light beam A emerges from lens 38 as a collimated small diameter light beam which then passes into a beam splitter polarization cube 42 which reflects polarized light of a single orientation into the remainder of the probe optics as beam B. This reduces system noise by eliminating non-linear polarization effects inherent in the subsequent probe optics. The transmitted portion of beam A, as beam A', is terminated into beam dump 44.

Polarized light beam B then passes through a second beam splitter cube 46, where a small portion of beam B, e.g., about 10%, is split off and reflected out of beam splitter cube 46 as beam B'. Beam B', which becomes the reference beam, is incident on first photodiode detector 50, which then supplies a reference signal via cable 32 to signal detection processing station 30 corresponding to the input beam power. The transmitted portion of beam B passes through beam splitter cube 46 and emerges as beam C.

Transmitted beam C from beam splitter cube 46 now enters the main portion of probe 2 where it is reflected in a criss-crossing pattern across the vapor flow by four front-surface mirrors. Beam C is adjusted to center the beam on the front surface of a first mirror 60 by adjustment of connector-collimator 40. Beam C is deflected by first mirror 60 at an angle which permits deflected beam $C_1$ to cross axis Y, representing the axis of the central passageway in probe 2, and therefore the central axis of the vapor plume, as will be further explained below, at a first angle $\alpha_1$, as shown in FIG. 2. Beam $C_1$ then is sufficiently deflected as beam $C_2$, by a second mirror 62 to recross axis Y at a 90° angle, thereby defining an angle $\beta_1$, at mirror 62, between beams $C_1$ and $C_2$, where the sum of angles $\alpha_1+\beta_1=90°$. Beam $C_2$ is then deflected by a third mirror 64 as beam $C_3$ back across axis Y, with beam $C_3$ defining an angle $\alpha_2$ with axis Y. In a preferred embodiment, for ease in building the probe and analysis of the measurement, angle $\alpha_2$ is made equal to angle $\alpha_1$, i.e., the same size angle as defined between beam $C_1$ and axis Y as shown in FIG. 2, and defining an angle $\beta_2$ between beams $C_2$ and $C_3$ at mirror 64 which is equal to angle $\beta_1$. Finally, beam $C_3$ is shown as reflected off a fourth mirror 66 to pass through an optical filter 68 into a second photodiode detector 70. The purpose of optical filter 68 is to attenuate undesired white light which would add noise and possibly overload second photodiode detector 70.

It should be noted that mirror 66, which deflects the path of beam $C_3$ after the passage of the beam through the vapor plume for the third time, is optional, serving principally to redirect beam $C_3$, as beam $C_4$, through filter 68 and second photodiode detector 70. If desired, both filter 68 and second photodiode detector 70 could be relocated in probe 2 coaxial to beam $C_3$. However the advantage of mirror 66 is that it permits alignment of beam $C_4$ onto filter 68 and second photodiode detector 70 independent of the passage of the beam through the vapor plume in the central passageway, i.e., such alignment is after the passage of the light beam through the vapor plume.

It should be noted, in this regard, that angle $\alpha_1$ which beam $C_1$ forms with axis Y is preferably equal to angle $\alpha_2$ which return beam $C_3$ forms with axis Y. This passage of the light beam back and forth through the vapor twice at the same angle, but in opposite directions is important to the verification of the alignment of the flow of the vapor to the axis of the central passageway of the probe, as will be explained in further detail below.

It will also be noted, as mentioned above, that the sum of angle $\alpha_1$, the angle formed by beams $C_1$ and $C_3$ with axis Y of the vapor plume plus angle $\beta_1$, the angle formed by beams $C_1$ and $C_3$ with beam $C_2$ equals 90°. Therefore, if mirror 66 was not present, precise alignment of beam $C_3$ with filter 68 and second photodiode detector 70 would be more difficult, since movement of mirror 64, to accomplish such alignment would result in a need to also readjust mirror 62 to maintain equality between angle $\beta_1$ and angle $\beta_2$ to thereby maintain equality between angles $\alpha_1$ and $\alpha_2$. In fact, as will be explained below, mirrors 62 and 64 are preferably mounted to housing 10 in probe 2 in a fixed prealigned position to one another to ensure the equality of angle $\beta_1$ and angle $\beta_2$.

As the light beam is scanned in frequency, the ratio of the reference signal from first photodiode detector 50 (representing the energy of the beam prior to passage of the vapor plume therethrough) and the signal from second photodiode detector 70 (representing the energy in the beam after the vapor plume has passed through the beam once orthogonal to the path of the vapor plume, and in opposite directions through the vapor plume at angle $\beta$) are then processed in signal processing station 30 to obtain the density, velocity, temperature, and flow direction of the vapor plume.

Figure 7A:
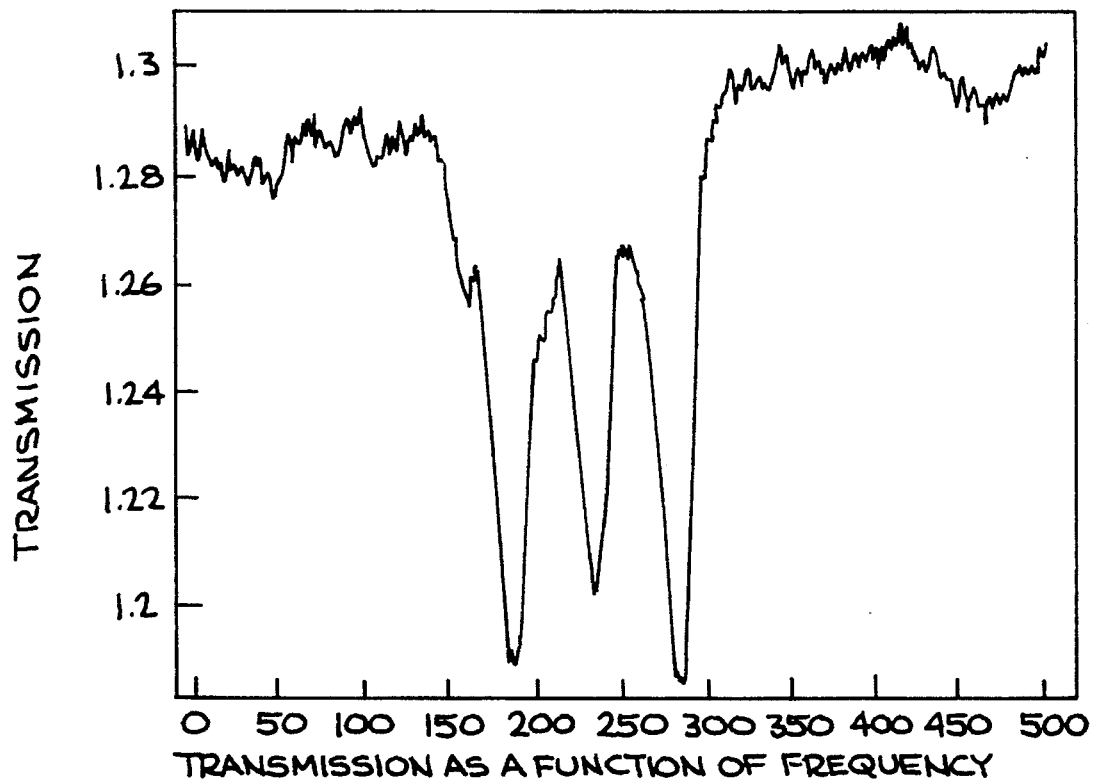
FIG. 7A is a typical absorption trace from the vapor probe when the laser is scanned in frequency. The three absorption peaks are a result of the light beam passing through the vapor plume three times.

Referring to FIG. 7A, the absorption peaks representing the three passages of main light beam C through the vapor passing through the main passage in probe 2 are shown. In atomic laser absorption spectroscopy, the frequency of the laser is tuned to an electronic transition of the element of interest. As the light travels through the vapor, a fraction of the atoms absorb a photon which excites an electron to a higher energy level. By measuring the percentage of light transmitted through the vapor, the vapor density can be inferred from the BeerLambert law. (Transmission=$e^{-n\sigma l}$, where n is the density, $\sigma$ is the cross section for the transition of interest, and 1 is the path length through the vapor.) Electronic transitions are very narrow in frequency. The width of the transitions is doppler broadened by the velocity component of the vapor along the path of the laser light. By aligning the laser path closer to the vapor flow direction, the absorption peak can be shifted in frequency. The vapor probe takes advantage of this effect to put three absorption peaks in one frequency scan of the laser. The three peaks in the absorption trace are caused by the doppler shifted absorption in beams $C_1$ and $C_3$. In beam path $C_1$, the vapor and a component of the light beam are counter-propagating. This doppler shifts the absorption peak to a lower frequency. The amount of the doppler shift depends on angle $\alpha_1$ between beam path $C_1$ and axis Y of the central passageway through which the vapor is flowing, the velocity of the vapor, and the wavelength of light beam $C_1$. The only unknown, then, is the velocity of the vapor; and therefore the doppler shift of light beam $C_1$ is a measure of the vapor flow velocity. For light beam path $C_2$, the light beam propagates in a direction perpendicular to central passageway Y through which the vapor is flowing. In this case, the absorption is unshifted and the width of the absorption peak is a measure of the thermal motions of the vapor perpendicular to the flow direction, i.e. perpendicular to axis Y of the central passageway of probe 2. In beam path $C_3$, the light propagation direction has a component along the direction of vapor flow. Therefore, the absorption is doppler shifted to a higher frequency. The width of both peaks 1 and 3 are determined by the thermal motions of the atoms along the direction of light propagation. This motion can be deconvoluted into components in directions perpendicular and parallel to the flow direction of the vapor in the central passageway. Thus, the shape and locations of the peaks can be used to measure the local density, the vapor flow velocity, and the kinetic temperatures in directions perpendicular and parallel to the vapor flow direction.

This explains how the vapor probe works when the probe is perfectly aligned with the vapor flow direction. However, since the probe has two redundant light beam paths, $C_1$ and $C_3$, at identical, but opposite angles to the vapor flow direction, the frequency shift of these two light paths can be used to calculate the angle of any misalignment between the probe axis Y and the vapor flow direction. Equivalently, the doppler shift of the center peak (from light path $C_2$) can be used to measure the misalignment angle. In this system a 300 MHz optical interferometer provides the relative frequency scale and an optogalvonic cell (a hollow cathode elemental spectral source) provides the absolute static spectral absorbance frequency. This method has been found to be accurate to within a few Megahertz.

Figure 7B:
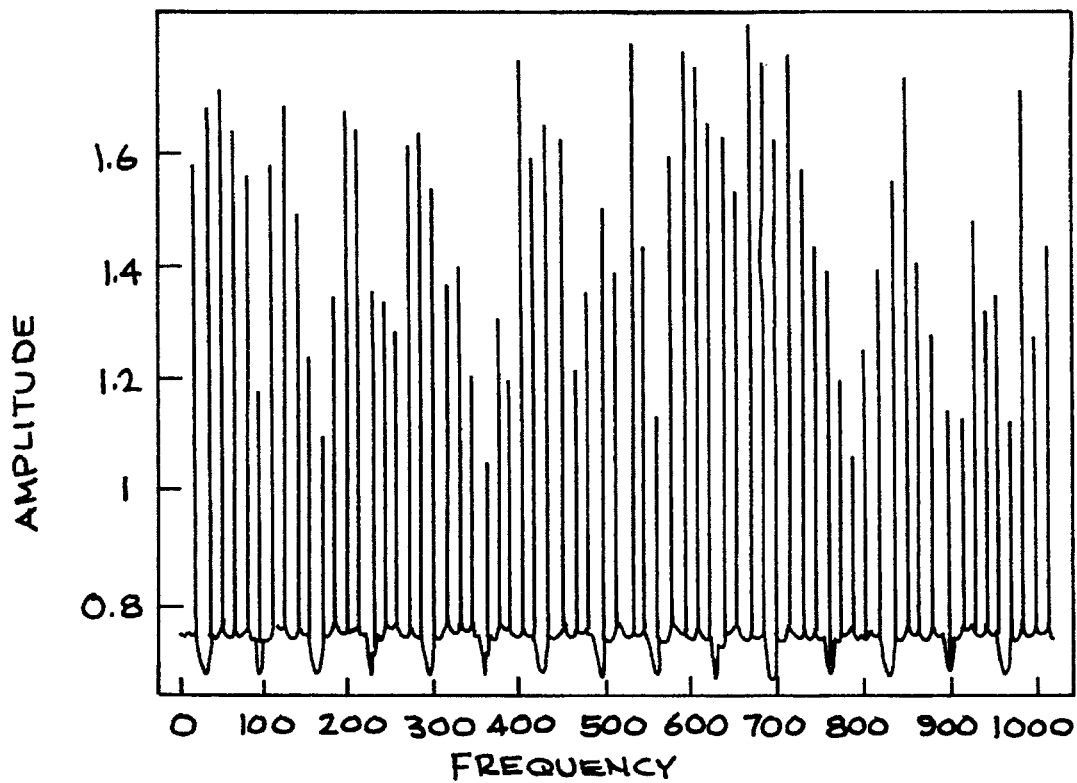
FIG. 7B is a graph of frequency markers used to analyze the absorption profile generated by the vapor probe.

In order to analyze the absorption profile generated by the vapor probe, an absolute frequency scale is desirable, although a relative freqeuncy scale is all that is required. Such an absolute frequency scale can easily be generated using two standard optical devices, an interferometer and an optogalvonic cell. The interferometer produces a comb-like structure when the laser is scanned in frequency (as shown in FIG. 7B). The teeth in the comb are a precise frequency apart, the exact frequency depending upon the exact interferometer used. This signal can then be used to generate a relative frequency range. The optogalvonic cell is element specific and provides the electro-optic equivalent of a stationary vapor source. Therefore, the electric signal from the optogalvonic cell provides a method of determining the frequency location of the electronic transition of interest. It should be noted that an equivalent, but more complicated, device for determining line center (the frequency of the electronic transition of interest) is the hollow cathode cell. A hollow cathode cell is effectively just a glass tube with vapor of the element of interest in it. However, this method requires an additional detector and appropriate sizing of the hollow cathode cell.

Using the above approach, the following equations can be used to analyze the vapor probe data:

$$\gamma = \tan^{-1}\left[ \frac{|\Delta f_1| - |\Delta f_3|}{|\Delta f_1| + |\Delta f_3|} \tan\theta \right] \quad (1)$$

$$v_f = \frac{\Delta f_1 \lambda}{\sin(\theta + \gamma)} = \frac{\Delta f_3 \gamma}{\sin(\theta - \gamma)} \quad (2)$$

$$T_x = \frac{1}{21n2}\left(\frac{\Delta f_x}{2} \lambda\right)^2 \frac{M}{N_0 k} \quad (3)$$

$$T_{parallel} = \frac{T_1 \cos^2\gamma - T_2 \sin^2(\theta + \gamma)}{\cos^2(\theta + \gamma) - \sin^2\gamma} \quad (4a)$$

$$= \frac{T_3 \cos^2\gamma - T_2 \sin^2(\theta + \gamma)}{\cos^2(\theta - \gamma) - \sin^2\gamma} \quad (4b)$$

$$T_{perpendicular} = \frac{T_2 - T_{parallel}\sin^2\gamma}{\cos^2\gamma} \quad (5)$$

$$n = \frac{-\int \ln\left(\frac{I}{I_0}\right) dv}{\sigma l} \quad (6)$$

where $\gamma$ is the misalignment angle; $\Delta f_x$ is the frequency offset from line center of peak x; x is 1, 2, or 3; $\theta$ is the angle between beam paths $C_1$ and $C_2$ ($\beta_1$ or $\beta_2$), $v_f$ is the vapor flow velocity; $\lambda$ is the transition wavelength, $T_x$ is the kinectic temperature of the vapor along light path $C_x$; M is the atomic weight of the species being monitored; $N_o$ is Avogadro's number; k is boltzman's constant; $T_{parallel}$ is the kinetic temperature of the vapor parallel to the flow direction; $T_{perpendicular}$ is the kinetic temperature of the vapor perpendicular to the flow direction; n is the local density of the species being monitored; $I/I_o$ is the fraction of light transmitted through the vapor; $\sigma$ is the transition strength, l is the path length through the vapor; and dv is the integral of the quantity with respect to frequency.

Thus, using the probe of the invention to detect the energy in the beam before and after absorption of energy by the vapor, and the above equations, the density, velocity, temperature, and flow direction of the vapor in the vapor plume can be determined. It should be pointed out that the density is proportional to the area under one of the absorption peaks and inversely proportional to the length of the laser path through the vapor. It is, therefore, easiest to calculate the density from the center peak of the absorption profile since this location is where the vapor path length is best defined.

Figure 3:
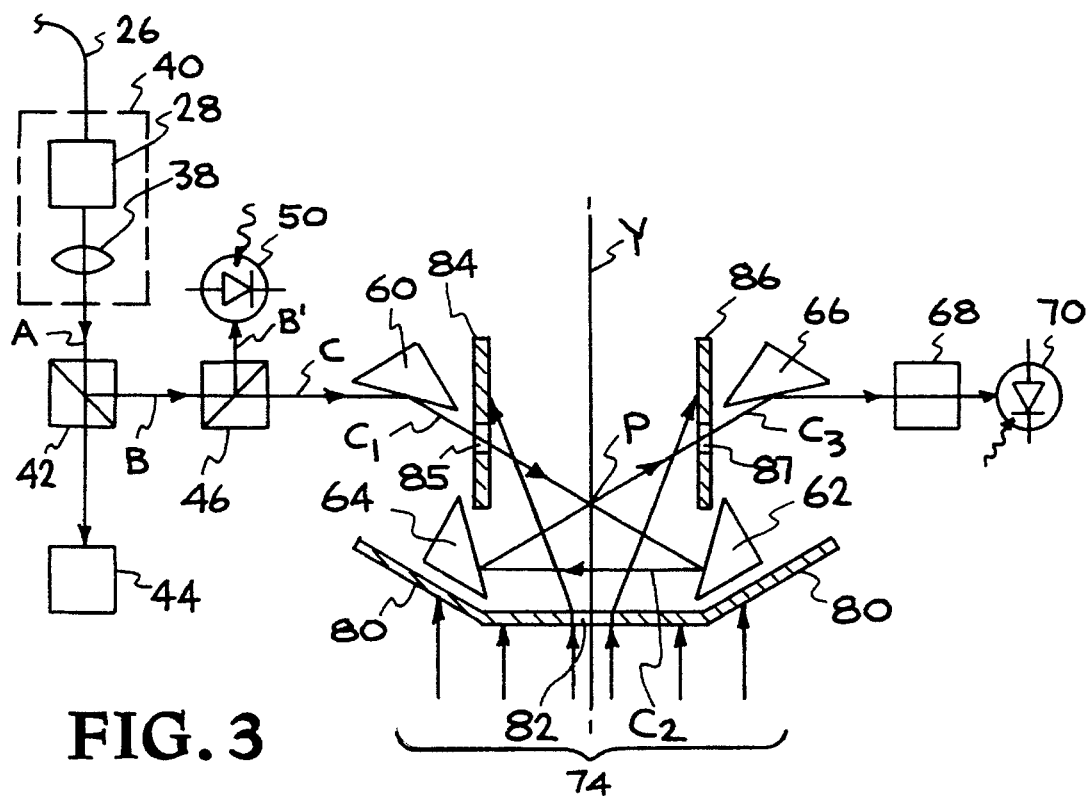
FIG. 3 is a schematic view of the optical path of FIG. 2 showing the flow of vapor through the probe and the positioning of shields in the probe to protect the optics from contact with the vapor.
Figure 4:
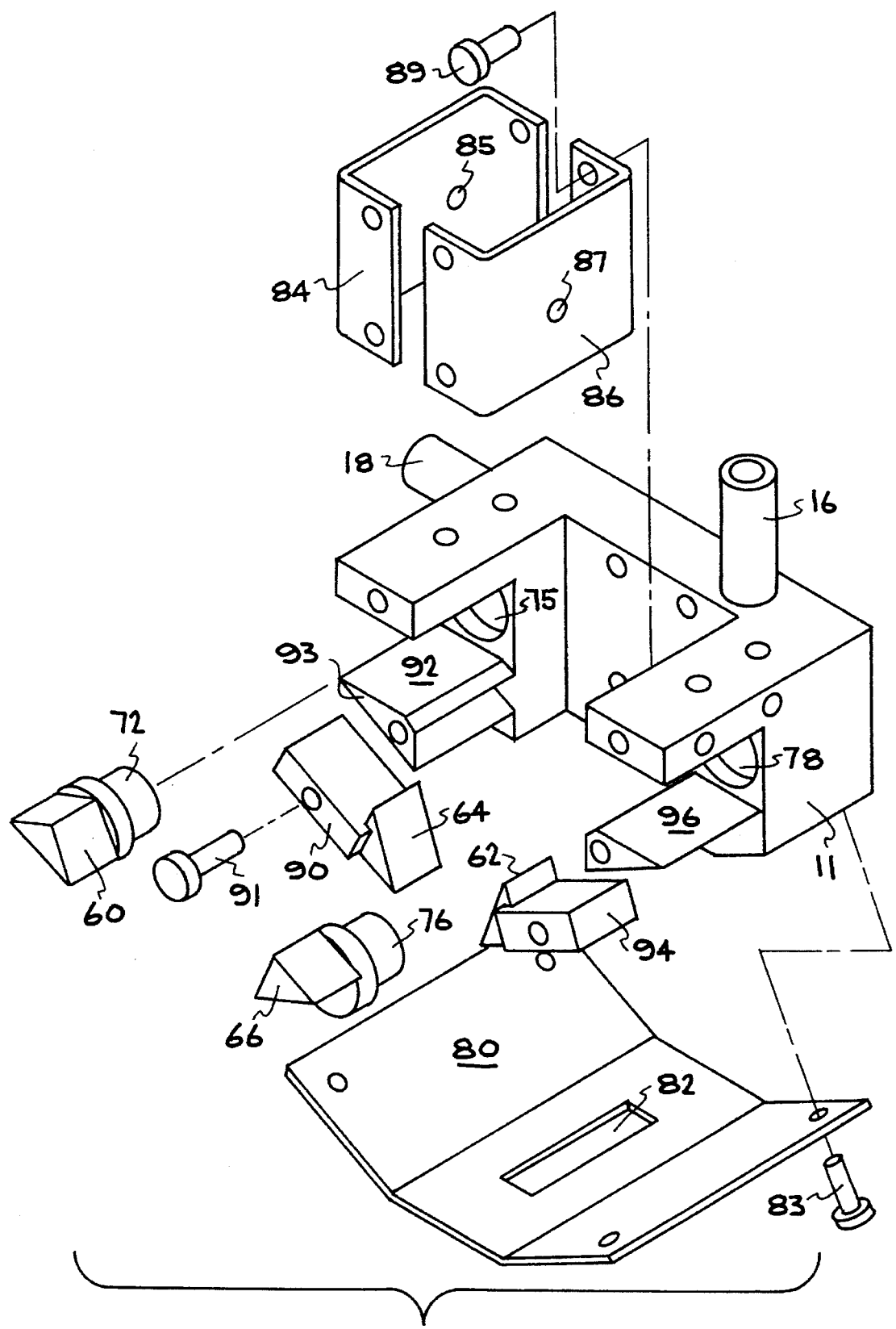
FIG. 4 is an exploded view of the interior of a portion of the probe showing the mounting of the shields and the optical mirrors to the body of the probe to respectively define a central passageway for the vapor through the probe and the optical path of the light beam through the vapor passing through the central passageway.

The vapor plume emanating from vapor source 20 may be corrosive in nature or in other ways have a deleterious effect on the optics in probe 2 as the vapor plume passes through probe 2. Therefore, in accordance with one aspect of the invention, as shown in FIGS. 3 and 4, shields are provided between the vapor plume and each of the four reflecting mirrors 60–66. First shield 80 is provided with a narrow slit 82 through which vapor plume 74 passes into the optical paths of light beams $C_1$, $C_2$, and $C_3$. As vapor plume 74 rises from vapor source 20, shield 80 blocks the majority of the plume,but allows for a sample of the vapor to pass through slit 82, while shielding mirrors 62 and 64 from the vapors in vapor plume 74. As vapor plume 74 emerges from slit 82, the plume begins to widen again and could contact upper mirrors 60 and 66. Secondary shields 84 and 86, are therefore respectively positioned between vapor plume 74 and mirrors 60 and 66 to shield mirrors 60 and 66 from vapor plume 74. Slit 82 in shield 80 and secondary shields 84 and 86 together define a central passageway through probe 2 having a center axis Y, as shown in FIG. 3, through which the vapor to be analyzed flows.

Shield 84 is provided with an opening 85, as shown in both FIGS. 3 and 4, through which beam $C_1$ passes, while shield 86 is provided with an opening 87 through which beam $C_3$ passes. It will be noted that the relative positions of openings 85 and 87, with beams $C_1$ and $C_3$ passing therethrough are positioned so as to avoid a line-of-sight view from slit 82 to mirrors 60 and 66, to prevent vapors, passing through openings 85 and 87, from coating mirrors 60 and 66.

FIG. 4 shows the respective mounting of mirrors 60–66 and shields 80 and 84–86 to central body portion 11 of housing 10. Shield 80 is shown mounted to body 11 via bolts 83 received in threaded bores (not shown) in body 11, while shields 84 and 86 are mounted to body 11 via bolts 89 also received in threaded openings (not shown) in body 11 to thereby define the central passageway for the vapor to travel through probe 2, as indicated by central axis Y in FIGS. 2 and 3.

Figure 5:
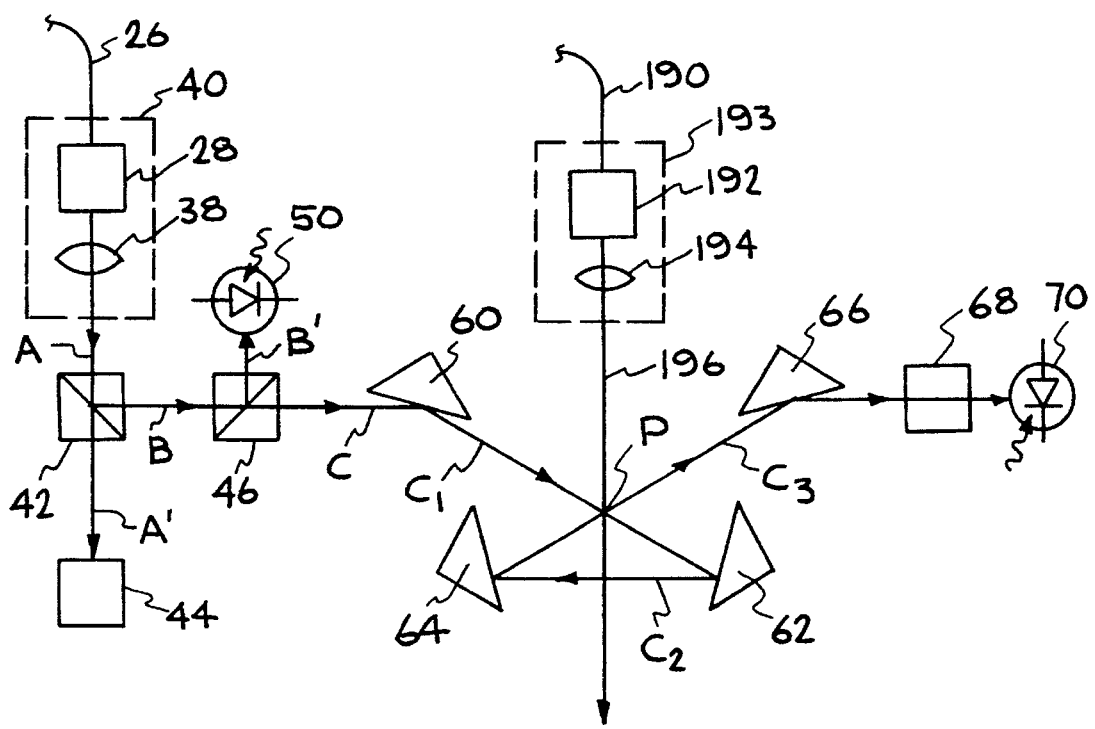
FIG. 5 is a schematic view of the optical beam path of FIG. 2 shown with an alignment beam used to align the axis of the probe with the vapor flow direction through an opening from the vapor source.

Mirror 60 is mounted, e.g., by bonding, to a rotatable cylinder 72 which is rotatably received in a bore 75 in body 11. The ability to rotate mirror 60 provides for alignment of light beams $C_1$ and $C_2$ with central axis Y so that all three intersect at point P, as seen in FIGS. 2–3 and 5. Mirror 66 is similarly mounted to cylinder 76, which is, in turn, rotatably received in bore 78 in body 11.

Mirrors 62 and 64 are preferably non-rotatably secured to body 11. Thus, as shown in FIG. 4, mirror 64 is secured to a mounting block 90 which is secured to body 11 by a mounting bolt 91 received in a threaded bore (not shown) in body 11. The angle of mirror 64 is fixed by the angled edge 93 of a positioning block 92 which is also secured to or machined into body 11. Mirror 62 is similarly nonrotatably affixed to body 11 via mounting block 94 and positioning block 96.

To align the beam path of the vapor probe, connector/collimator unit 40 is adjusted to center the light beam C in the center of mirror 60. Mirror 60 is then rotated such that the beams $C_1$ and $C_2$ reflect off mirrors 62 and 64 and beam $C_3$ becomes centered in mirror 66. This alignment results in beams $C_1$ and $C_3$ intersecting at point P and in beam $C_2$ being orthogonal to the center axis Y of probe 2.

To provide for accurate crossing of vapor plume 74 by light beams $C_1$ and $C_3$ at the same angle, i.e., angle $\alpha_1$=angle $\alpha_2$, and for crossing of vapor plume by beam $C_2$, at 90°, as well as alignment of shields 80, 84, and 86 with vapor plume 74, it is important that central axis Y of the central passageway in probe 2 be initially aligned with both vapor plume 74 and the intersection of light beams $C_1$ and $C_3$ at point P. Turning now to FIGS. 5, and 6A–6C, alignment and adjustment means are illustrated. A light source (not shown) such as a laser source, is connected via fiber optics cable 190 to a fiber optics connector 192 temporarily mounted on probe 2. The light passes from connector 192 through a collimating lens 194, to provide an alignment beam 196 which is used to align probe 2 and central axis Y therein with vapor plume 74. Connector 192 and lens 194 comprise a combined connector collimator unit 193, similar to unit 40.

Figures 6A, 6B, 6C:
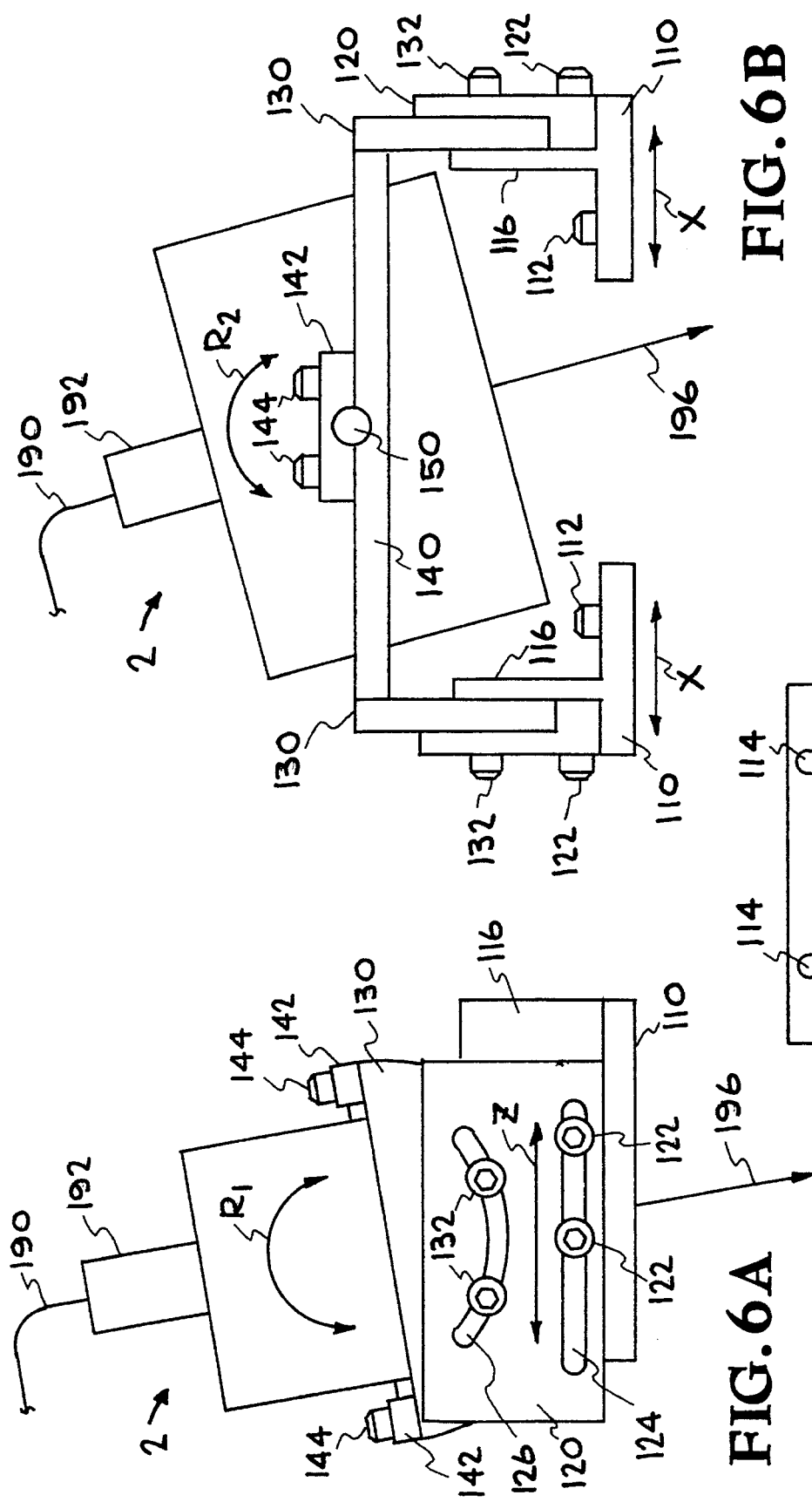

After alignment beam 196 has been activated, probe 2 is shifted laterally and/or tilted until alignment beam 196 and center axis Y are aligned to the source of vapor plume 74. As shown in FIGS. 6A and 6B, bracket 100 of FIG. 1 actually comprises several components which are slidably or tiltably adjustable relative to one another to thereby provide both lateral and angular movement and adjustment of probe 2 relative to vapor source 20.

Two bracket portions 110 are each fastened above vapor source 20 by bolts 112 which pass through elongated slots 114 in first brackets 110 and are received in threaded openings (not shown) in vapor source 20. Loosening of bolts 112 permit brackets 110 to slide, via slots 114, relative to bolts 112 and vapor source 20, as shown by arrows X, as shown in FIG. 6B. Each first bracket 110 has a second bracket 120 slidably fastened to a respective upright portion 116 of first bracket 110 by bolts 122 which pass through elongated slots 124 on second brackets 120 and are received in threaded openings (not shown) in upright portions 116 of brackets 110. Loosening of bolts 122 permits second brackets 120 to slide along slots 124, relative to bolts 122 and first brackets 110, as shown by arrow Z in FIG. 6A. Thus lateral movement of probe 2 in both the X and Z directions, relative to vapor source 20 is permitted by the slotted mounting of first brackets 110 to vapor source 20 and the slotted mounting of second brackets 120 to first brackets 110 to secure lateral alignment of beam 196 (and axis Y) with vapor plume 74.

However, while probe 2 is, in its simplest form, mounted so that alignment beam 196 thereon will be perpendicular to the plane of the top of vapor source 20, vapor plume 74 does not always emerge from vapor source 20 in a direction normal to the top surface of vapor source 20. Therefore to align the optics in probe 2 with the center of vapor plume 74, via alignment beam 196, it is sometimes also necessary to tilt probe 2 with respect to the plane of the top of vapor source 20. To provide for tilting of probe 2 about the X axis, third brackets 130 are provided, as seen in FIG. 6A, Brackets 130 are secured to brackets 120 through bolts 132 which pass through arcuate slots 126 and are received in threaded openings (not shown) in brackets 130. Loosening of bolts 132 permits brackets 130 to be rotated, with respect to brackets 120 in the directions noted by arrows $R_1$ in FIG. 6A.

To permit rotation of probe 2, about the Z axis, rails 140 are provided on opposite sides of probe 2 between third brackets 130. Blocks 142, which are secured to rails 140 by bolts 144, secure pivot pins 150 to nails 140. Pivot pins 150 are machined in housing 10 of probe 2 to permit probe 2 to tilt in the direction shown by arrows $R_2$, as seen in FIG. 6B, when bolts 144 are loosened.

Thus, to align the central axis Y axis of probe 2, through which the vapor plume will pass, with the center of the vapor plume, probe 2 may be laterally moved along either the X or Z axis; and may be rotated, with respect to either the X axis or the Z axis. After alignment, all of the bolts (112, 122, 132, and 144) are tightened.

Once center axis Y of probe 2 is aligned with the center of the vapor plume, light beams $C_1$ and $C_3$ are adjusted to intersect with one another and with alignment beam 196 at point P by adjustment of connector collimator unit 40 and mirror 60. When point P has been established, mirror 66 may then be rotatably adjusted to align beam $C_4$ with filter 68 and detector 70. The alignment beam 196 is then shut off and connector/collimator 193 removed from probe 2 so as to not impede the flow of vapor plume 74 through probe 2, as well as to avoid subjecting the alignment beam hardware to any adverse effects from the contents of vapor plume 74.

Thus, the probe of the invention provides a mechanism for absorbing energy from a light beam by passing it through a vapor plume in a first direction at a first angle ranging from greater than 0° to less than 90°, passing the light beam back through the vapor plume at a 90° angle, and then passing the light beam through the vapor plume a third time at a second angle equal to the first angle, using a series of mirrors to deflect the light beam, while protecting the minors from the vapor plume with shields, so that the velocity, density, temperature and flow direction of the vapor plume may be determined by a comparison of the energy from a reference portion of the beam with the energy of the beam after it has passed through the vapor plume.

While a specific embodiment of the probe of the invention for measurement of the velocity, density, temperature, and direction of flow of vapor in a vapor plume has been illustrated and described, modifications and changes of the apparatus, parameters, materials, etc. will become apparent to those skilled in the art, and it is intended to cover in the appended claims all such modifications and changes which come within the scope of the invention.

What is claimed is:

1. A probe capable of use in measuring the velocity, density, temperature, and flow direction of vapor in a vapor plume which comprises:
   a) a housing having a central passageway through which said vapor flows through said probe;
   b) means for receiving a beam of light in said probe;
   c) a plurality of reflective means for diverting the path of said light beam to cross said vapor flow in said central passageway at least two times, at least one of said at least two times being at an acute angle with respect to the direction of said vapor flow, at least another of said at least two times in a direction perpendicular to said main axis of said central passageway; and
   d) photo detection means for measuring the energy of said light beam after it has crossed said vapor flow in said central passageway said at least two times.

2. The probe of claim 1 wherein said plurality of reflective means for diverting directs said light beam to cross said vapor flow in said central passageway a first time at a first acute angle with respect to the direction of said vapor flow, to then cross said vapor flow in said central passageway a second time in a direction perpendicular the direction of said vapor flow, and to then cross said vapor flow in said central passageway a third time at a second acute angle with respect to the direction of said vapor flow.

3. The probe of claim 2 wherein one or more shields are provided to protect said plurality of reflective means in said probe from said vapor in said vapor plume.

4. The probe of claim 2 which further comprises a beam splitter for splitting said light beam into two beams, a reference beam and a main beam, said main beam is passed through said vapor, and separate photodetection means are provided to respectively measure the energy of said reference beam and said main beam.

5. The probe of claim 2 wherein said means for receiving a beam of light in said probe further includes means for collimating said beam of light and means for polarizing said collimated beam of light.

6. The probe of claim 5 wherein said means for receiving a beam of light in said probe further includes beam splitter means for splitting said beam front said collimating unit and reflecting a polarized portion of said split beam to said reflective means.

7. The probe of claim 2 wherein said second acute angle is equal to said first acute angle.

8. The probe of claim 1 which further includes lateral alignment means for laterally shifting said probe in a direction perpendicular to said main axis of said central passageway to align said central passageway with said flow of vapor flow into said probe.

9. The probe of claim 8 which further includes first rotational alignment means for rotating said probe in a first axis perpendicular to said main axis of said central passageway to thereby assist in aligning said main axis of said central passageway in said probe with the direction of said vapor flow into said probe.

10. The probe of claim 9 which further includes second rotational alignment means for rotating said probe in a second axis perpendicular to said main axis of said central passageway and also perpendicular to said first axis to thereby assist in aligning said main axis in said central passageway in said probe with the direction of said vapor flow into said probe.

11. The probe of claim 10 wherein alignment beam means are provided on said probe for directing an alignment beam of light through said central passageway along said main axis to assist in adjusting said alignment means.

12. A probe for measuring the velocity, density, temperature, and flow direction of vapor in a vapor plume which comprises:
   a) a housing;
   b) a central passageway within said housing for providing a flow of said vapor through said probe;
   c) a light processing unit for providing a beam of collimated and polarized light in the probe;
   d) a beam splitter for splitting said beam of light into two beams, a reference beam and a main beam;
   e) a first detector for detecting the energy of said reference beam;
   f) a first mirror for diverting the path of said main beam to cross said vapor flow in said probe through said central passageway therein at a first angle of from greater than 0 degrees to less than 90 degrees with respect to the main axis of said central passageway;
   g) a second mirror for diverting said path of said main beam at an angle sufficient to cause said main beam path to recross said flow of said vapor in said central passageway in a direction perpendicular to said main axis;
   h) a third mirror for diverting the path of the main beam to cause said main beam path to cross said vapor flow in said central passageway for a third time at a second angle, with respect to said main axis of said central passageway, with said second angle of said main beam equal to said first angle;
   i) a second detector for measuring the energy of said main beam after it has crossed said vapor flow in said central passageway three times;
   j) lateral alignment means for laterally shifting said probe in a direction perpendicular to said main axis of said central passageway to align said central passageway with said flow of vapor flow into said probe;
   k) first rotational alignment means for rotating said probe around a first axis perpendicular to said main axis of said central passageway to thereby assist in aligning said main axis of said central passageway in said probe with the direction of said vapor flow from said vapor source into said probe; and
   l) second rotational alignment means for rotating said probe around a second axis perpendicular to said main axis of said central passageway and also perpendicular to said first axis to thereby assist in aligning said main axis in said central passageway in said probe with the direction of said vapor flow into said probe.

13. The probe of claim 12 which further includes:
   a) alignment beam means provided on said probe for directing an alignment beam of light through said central passageway along said main axis to assist in adjusting said alignment means; and b) means for rotating said first minor to permit said deflected light beam from said first minor and said deflected light beam from said third mirror to simultaneously intersect said alignment beam.

14. A probe for use in measuring the velocity, density, temperature, and flow direction of vapor in a vapor plume which comprises:

a) a housing having a central passageway therein for providing a flow of said vapor through said probe from a vapor source to which said housing is adjustably mounted;

b) a light processing means for providing a beam of collimated and polarized light in the probe;

c) beam splitter means for splitting said beam of collimated polarized light into two beams, a reference beam and a main beam;

d) a first photo detector for detecting the energy of said reference beam;

e) first reflective means for diverting the path of said main beam to cross said vapor flow in said probe through said central passageway therein at a first angle of from greater than 0 degrees to less than 90 degrees with respect to a main axis of said central passageway;

f) second reflective means for diverting said path of said main beam at an angle sufficient to cause said main beam path to recross said flow of said vapor in said central passageway in a direction perpendicular to said main axis;

g) third reflective means for diverting the path of said main beam to cause said main beam path to cross said vapor flow in said central passageway for a third time at a second angle, with respect to said main axis, equal to said first angle; and h) a second photo detector for measuring the energy of said main beam after it has crossed said vapor flow in said central passageway three times.

15. The probe of claim 14 which further includes means for laterally shifting said probe in a direction perpendicular to said main axis of said central passageway to align said central passageway with said flow of vapor flow into said probe.

16. The probe of claim 15 which further includes first rotational alignment means for rotating said probe around a first axis perpendicular to said main axis of said central passageway to thereby assist in aligning said main axis of said central passageway in said probe with the direction of said vapor flow from said vapor source into said probe.

17. The probe of claim 16 which further includes second rotational alignment means for rotating said probe around a second axis perpendicular to said main axis of said central passageway and also perpendicular to said first axis to thereby assist in aligning said main axis in said central passageway in said probe with the direction of said vapor flow into said probe.

18. The probe of claim 17 wherein an alignment beam means are provided on said probe for directing an alignment beam of light through said central passageway along said main axis to assist in adjusting said alignment means.

* * * * *